United States Patent
Hillis

[19]

[11] Patent Number: 6,055,523
[45] Date of Patent: Apr. 25, 2000

[54] METHOD AND APPARATUS FOR MULTI-SENSOR, MULTI-TARGET TRACKING USING A GENETIC ALGORITHM

[75] Inventor: David B. Hillis, Kensington, Md.

[73] Assignee: The United States of America as represented by the Secretary of the Army, Washington, D.C.

[21] Appl. No.: 08/903,197

[22] Filed: Jul. 15, 1997

[51] Int. Cl.[7] .................................................. G06F 15/18
[52] U.S. Cl. ................................ 706/13; 706/12; 706/14
[58] Field of Search .................................. 706/13, 14, 12

[56] References Cited

U.S. PATENT DOCUMENTS

| | | | |
|---|---|---|---|
| 4,593,286 | 6/1986 | Mathews et al. | 342/88 |
| 5,777,948 | 7/1998 | Ferkinhoff et al. | 367/131 |
| 5,793,931 | 8/1998 | Hillis | 706/13 |
| 5,959,574 | 9/1999 | Poore, Jr. | 342/96 |

OTHER PUBLICATIONS

Johnson, M.P., Automated creation of visual routines using genetic programming, Pattern Recognition, Jan. 1996., Proceedings of the 13th International Conference on vol. 1, 1996, pp: 951–956 vol. 1.

Ziemeck, P.; Ritter, H., Genetic programming as an integration platform for visual routines, Systems, Man, and Cybernetics, Jan. 1998. 1998 IEEE International Conference on vol. 3, 1998, pp: 2360–2366 vol. 3.

Kennedy, C.M., A conceptual foundation for autonomous learning in unforeseen situations, Intelligent Control (ISIC), Jan. 1998. Held jointly with IEEE International Symposium on Computational Intelligence in Robotics and Automation (CIRA), Intelligent Systems.

Koza, John R., Genetic Programming: On the Programming of Computers by Means of Natural Selection, The Massachusetts Institute of Technology, The MIT Press, Cambridge, MA, Jan. 1993 pp. 24 and 29.

John Holland, "Adaptation in Natural and Artificial Systems", The MIT Press, Jan. 1992.

*Primary Examiner*—Tariq R. Hafiz
*Assistant Examiner*—Wilbert L. Starks
*Attorney, Agent, or Firm*—Paul S. Clohan, Jr.; Mark D. Kelly; William E. Eshelman

[57] ABSTRACT

A method and apparatus wherein a Genetic Algorithm is used as an intelligent search technique addresses the problem of assigning sensor reports in multi-target tracking with one or more sensors. The inventive technique of tracking objects includes receiving sensor reports from at least one sensor over multiple time scans; formulating individuals in a GA population as permutations of the sensor reports; using each permutation to construct a hypothesis containing at least one track by a process of taking each sensor report in turn (in the order determined by the permutation) and making the best assignment available (either to an existing track or as the start of a new track); scoring each of the hypotheses; searching through a portion of the possible hypotheses, using a GA, to find a good hypothesis; and determining the state of the tracked object.

9 Claims, 1 Drawing Sheet

METHOD AND APPARATUS FOR MULTI-SENSOR, MULTI-TARGET TRACKING USING A GENETIC ALGORITHM

BACKGROUND OF THE INVENTION

The present invention relates in general to the problem of tracking one or more objects over time, and in particular to the problem of assigning reports from one or more sensors to tracks across multiple observation periods. It also relates to the problem of tracking multiple features on a moving elastic or inelastic object(s).

In a typical application, a tracker receives a stream of reports over time from one or more sensors (such as a radar), each of which may indicate either the detection of an actual object of interest (or closely spaced group of such objects) or a false alarm. The objects of interest may include, for example, aircraft, missiles, ships or land vehicles. The tracker may also be used to track particular points on an organ of an organism, in medical imaging applications.

The problem of assigning reports is to determine which reports correspond to which objects. For a tracker dealing with many reports collected across some time period (such that each real object may have generated two or more reports from observations at different times), the number of different ways of combining these reports into tracks (or tracks and false alarms) can grow very large. Each possible combination is called a hypothesis.

The problem of assigning reports involves searching for an optimal or near optimal hypothesis according to a metric specific to the tracker in question. In the general case, finding the optimal hypothesis for more than a small number of objects observed over time (such that each real object may have generated several reports from observations at different times) is impractical due to the high computational expense required. Therefore, suboptimal search techniques are usually employed.

Without loss of generality, we may describe the problem of assigning reports as if the sensor reports arrived in groups where each report in the group was collected over the same time period (called a "scan"). The problem of searching for an optimal or near optimal hypothesis across multiple scans is different in character from searching for the best hypothesis for the associations between reports from one scan and a set of tracks. In general, finding the local optimal assignment of objects (targets) to tracks for each scan does not guarantee that the global optimal assignment across many scans is achieved. Multi-scan, multiple target algorithms commonly used include Multi-Hypothesis Trackers (MHTs). See, for example, D. B. Reid, IEEE Transactions on Automatic Control (December 1979), pp. 843 to 854; S. S. Blackman, Multiple Target Tracking with Radar Applications (Artech House, Dedham, Mass., 1986).

A Genetic Algorithm (GA) is an artificial intelligence technique based loosely on the process of natural selection in evolutionary biology. See, for example, D. Goldberg, Genetic Algorithms in Search, Optimization, and Machine Learning (Addison-Wesley, Reading, Mass., 1989); J. Holland, Adaptation in Natural and Artificial Systems (University of Michigan Press, 1975); Z. Michalkawicz, Genetic Algorithms+Data Structures=Evolution Programs (Springer-Verlag, Berlin, 1992). The Genetic Algorithm has wide applications in optimization, intelligent search, and machine learning. See, for example, N. L. Ulder, et al, Genetic Local Search Algorithms for the Traveling Salesman, Parallel Problem Solving from Nature, 1st Workshop, Springer-Verlag, October 1990; H. C. Braun, On Solving Travelling Salesman Problems by Genetic Algorithms, Parallel Problem Solving from Nature, 1st Workshop, Springer-Verlag, October 1990; G. von Lawszewski, H. Muhlenbein, Partitioning a Graph with a Parallel Genetic Algorithm, Parallel Problem Solving from Nature, 1st Workshop, Springer-Verlag, October 1990.

To apply a GA, a problem is generally expressed in such a way that potential solutions can be encoded as character strings over some alphabet. Most commonly, these character strings are binary strings, but other representations such as matrices and computer program listings can be applied. Then, a population of potential solutions called "individuals" is formed. Each individual is decoded, tested against some metric and scored. A new population is then formed by mutation (small random changes) and recombination (forming a new individual using material from a pair of parent individuals). Individuals with high scores or fitnesses are selected to be parents with a higher probability than others. The new population is then decoded and scored and the process repeated until some end condition is reached.

A genetic algorithm is NOT a succession of random searches for highly fit individuals. As the adage goes, "genes use people to make copies of themselves". What a GA really processes are substrings (not necessarily contiguous) within the individuals' character strings called "schemata".

Using the biological metaphor, an individual's string is its genotype (each character is one gene), the expressed parameter values are its phenotype, and a schema (any pattern of particular character values in particular places in the bit string) is a combination of genes. The entire string is the genotype, a substring is a schema.

A "good schema" is one that is expressed to form some subset of the solution that confers an advantage to the individual. A "good schema" will, on the average, tend to occur in individuals with relatively high fitness values. These individuals will be selected more frequently as parents and will, in turn, produce more offspring containing that schema.

Over a few generations, the gene pool of the population changes as good schemata crowd out lesser ones. New schemata are constantly formed and evaluated. Some of the new schemata will crowd out previously successful schemata. Over time, individuals are formed from better schemata and tend to have higher fitness values. Of course, not all problems are compatible with this technique. An assumption of the technique is that, at least sometimes, schemata that are good in other contexts will remain good when combined.

While an individual represents just one total solution, the number of schemata it contains is equal to the number of (not necessarily contiguous) substrings of its bit string. By sampling a relatively small number of individuals over several generations, a GA can process a huge number of schemata. This inherent parallelism is key to the effectiveness of GAs.

A paper entitled "Multiple target tracking data association using a genetic algorithm", by Carrier, Leung, Lo, Litva, of McMaster Univ. Canada, was presented at the SPIE conference in Orlando in April 1996. The paper is in "SPIE Proceedings Vol. 2739". The approach of Carrier et al is to use a GA on the single scan problem to search for the best association between a list of detections and a list of tracks. The method of Carrier et al cannot easily be extended to the multiple scan case.

U.S. Pat. No. 5,793,931, issued on Aug. 11, 1998 (the "'931 patent") and having the same inventor as the present application, discloses a related multi-sensor multi-target tracking invention and is hereby incorporated by reference.

SUMMARY OF THE INVENTION

It is an object of the present invention to accurately track one or more objects (targets) over time to determine the state of the object(s).

These and other objects of the invention are achieved by a method of tracking at least one object comprising receiving sensor reports from at least one sensor over a window comprised of multiple time scans; formulating individuals in a GA population as permutations of the sensor reports; using each permutation to construct a hypothesis containing at least one track by a process of taking each sensor report in turn in the order determined by the permutation and making the best assignment available either to an existing track or as the start of a new track; scoring each of the hypotheses; searching through a portion of the hypotheses, using a GA, to find a good hypothesis; and determining a state of the at least one object.

Preferably, the good hypothesis is an optimal hypothesis across the window of multiple time scans.

The inventive method also includes tracking and determining states of multiple objects.

In a preferred embodiment, the method is performed over a sliding window of multiple time scans.

In another aspect of the invention, the method comprises receiving sensor reports from at least one sensor over a window comprised of multiple time scans; formulating individuals in a GA population as permutations of the sensor reports; using each permutation to construct a hypothesis containing at least one track by a process of taking each sensor report in turn (in the order determined by the permutation) and making the best assignment available (either to an existing track or as the start of a new track); scoring each of the hypotheses; searching through a portion of the hypotheses, using a GA, to find a good hypothesis; determining a state of the at least one object; forming a second window of multiple time scans that overlaps the window; receiving additional sensor reports from at least one sensor over the second window; formulating individuals in a GA population as permutations of the sensor reports; using each permutation to construct a hypothesis containing at least one track by a process of taking each sensor report in turn (in the order determined by the permutation) and making the best assignment available (either to an existing track or as the start of a new track); scoring each of the hypotheses; searching through a portion of the hypotheses, using a GA, to find a good hypothesis; and determining a second state of the at least one object.

Preferably, the steps of the method are repeated for multiple windows.

An apparatus according to the invention comprises means for receiving sensor reports from at least one sensor over multiple time scans; means for formulating individuals in a GA population as permutations of the sensor reports; means for using each permutation to construct a hypothesis containing at least one track by a process of taking each sensor report in turn (in the order determined by the permutation) and making the best assignment available (either to an existing track or as the start of a new track); means for scoring each of the hypotheses; means for searching through a portion of the hypotheses, using a GA, to find a good hypothesis; and means for determining a state of the at least one object.

Other objects, features and advantages of the invention will become apparent from the following detailed description taken in conjunction with the accompanying drawings.

DETAILED DESCRIPTION OF THE PREFERRED EMBODIMENTS

Figure 1:
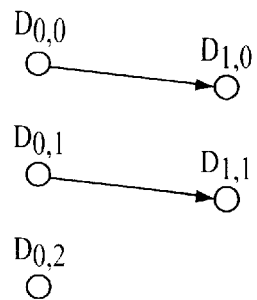
FIGS. 1–3 show alternative hypotheses for a scenario with five detections in two scans.

The invention includes a method and apparatus wherein a Genetic Algorithm (GA) is used as an intelligent search technique to address the problem of assigning sensor reports in multi-target tracking with one or more sensors. The inventive technique comprises receiving sensor reports from at least one sensor over multiple time scans; formulating individuals in a GA population as permutations of the sensor reports; using each permutation to construct a hypothesis containing at least one track by a process of taking each sensor report in turn (in the order determined by the permutation) and making the best assignment available (either to an existing track or as the start of a new track); scoring each of the hypotheses; searching through a portion of the possible hypotheses, using a GA, to find a good hypothesis; and determining the state of the tracked object.

The "state" of the tracked object may include, for example, the object's position, velocity and acceleration.

The tracker "scores" hypotheses according to a metric or test specific to the tracker. A "good" hypothesis is one that has a "score" within some acceptable range for the specific application of the tracker.

The permutation of the sensor reports is used as the genotype for a GA so that a population in the GA comprises a group of such permutations. In the '931 patent, the GA is used as the intelligent search technique and lists of associations between sensor reports are used as the genotype for a GA so that a population in the GA comprises a group of such lists. The GA is employed to search through the space of possible hypotheses for the purpose of finding a good (though quite possibly sub-optimal) hypothesis. In this application, however, the GA is employed to search through the space of possible hypotheses for the purpose of finding a good (though quite possibly sub-optimal) hypothesis. The construction and scoring of the track(s) may be performed using standard techniques familiar to those skilled in the art of tracker design. See, for example, S. S. Blackman, Multiple Target Tracking with Radar Applications (Artech House, Dedham, Mass., 1986).

As an example, a hypothetical tracker processing the reports from two sensors will be described. Both sensors will be assumed to be "scanned" systems in that one scan of data will consist of zero or more reports all representing observations of the sensor taken at one time. Consecutive scans will consist of reports from consecutive time intervals. The inventive technique is equally applicable for different numbers of sensors which need not be scanned systems. The sensors will be assumed to process their received data and send to the tracker reports from presumed detected objects.

The tracker uses the GA to search for the best hypothesis over a sliding window of time that is, for example, five scans deep. Theoretically, the window could be large enough to hold all of the reports received since the tracker was started, but, in practice, the depth of the window chosen will reflect the anticipated behavior of the sensors and objects as well as the processing power available. A single fixed hypothesis holds the track estimates up to the start of the current window. This single fixed hypothesis cannot be changed. The GA searches the space of extensions of this fixed hypothesis across the window. At the end of the time available, the best solution found so far is used to construct a new fixed hypothesis one scan further in time. The window slides forward to include the next scan of data, (The new window overlaps the old, offset by one scan) the GA is called again to find the best hypothesis, and the process continues.

The GA developed for this tracker uses order based strings and has non overlapping generations. Similar implementations are found in the literature, sometimes applied to the Traveling Salesman or Graph Partitioning problems. Each individual is a string of integers in the form of a permutation of length N, where N is the number of points in the window.

Mutation consists of taking a single random point in the string and moving it to a random location. In crossover, parts of two parents are combined to form two children. To form valid individuals, the children must also be permutations. A random cross point on the string is chosen, and all points before it are copied over from the first parent into the first child. All points in the second parent whose values do not already exist in the child are copied into the remaining half of the child in the order in which they are found in the second parent. For the second child, the roles of the two parents are reversed.
Example:
parent1=1-2-3-4-5-6
parent2=3-4-1-2-6-5
The chosen cross point is between the third and fourth points, therefore: the first part of the first child=1-2-3. The remaining numbers in parent1 (4,5, and 6) are in the order 4, . . . 6,5 in parent2. Therefore: the first child=1-2-3-4-6-5 and the second child=3-4-1-2-5-6.

The individuals are used to generate hypotheses in the Track module. The Track module forms hypotheses by taking each detection in order and choosing the best association available for that detection (the track which is its best match). The GA searches for the best order in which to process the detections.

As each point is received (in the order described by the individual), the module calculates the cost of associating that detection with each of the active tracks it has already formed for that individual (if any) and the cost of assigning the detection as a new track. (Track associations that would require a target to move backwards in time, occupy two places at once or violate other constraints are given prohibitively high costs). The lowest cost option is taken, the track's state is updated using a track filter (such as a Kalman Filter; see, for example, S. S. Blackman, Multiple Target Tracking with Radar Applications (Artech House, Dedham, Mass., 1986)), and the next detection is considered until all points have been assigned. The fitness of the individual (string, hypothesis) is taken using standard techniques familiar to those skilled in the art of tracker design.

Figure 2:
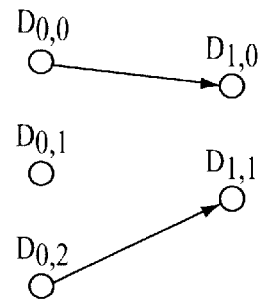
Figure 3:
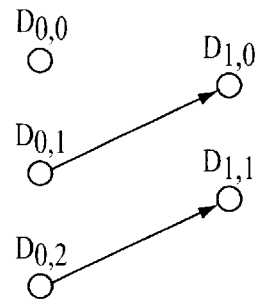

FIGS. 1–3 show some of the possible hypotheses for a simple scenario with five detections in two scans. Di,j indicates the jth detection in scan i. The circles represent detections, the arrows indicate associations between the detections.

Figure 4:
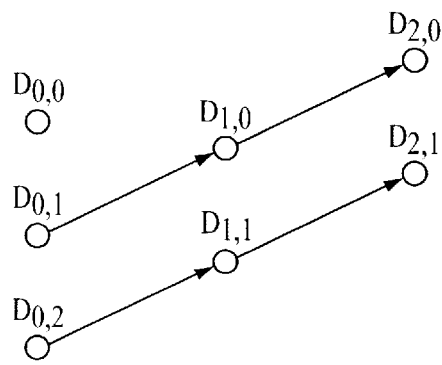
FIG. 4 shows a hypothesis for seven detections in three scans.

With this model, the hypothesis in FIG. 1 could be encoded by the string:
D,0-D1,0-D0,1-D,1-D0,2. The hypothesis in FIG. 2 could be encoded by the string:
D0,0-D1,0-D0,2-D1,1-D0,1. The hypothesis in FIG. 3 could be encoded by the string:
D0,1-D1,0-D0,2-D1,1-D0,0. The hypothesis in FIG. 4 could be encoded by the string:
D0,1-D1,0-D2,0-D0,2-D1,1-D2,1-D0,0.

The mapping of strings to hypotheses is not one to one. Strings with detections in different order may or may not decode into different hypotheses depending on whether the detections could be associated with the same tracks.

The Tracker Program

When the tracker is first turned on, there are no prior points to consider, there are no points in the window, and there is nothing for the tracker to do. At some scan in the future, some points are reported. A population is formed from random permutations. Each individual is decoded into a hypothesis and scored. It may be that none of the points are allowed to associate with any point other than themselves in which case the population would represent many identical hypotheses in which all points are the start of new tracks. The GA is called to operate on the population until a fixed number of generations have been completed, or the difference in fitness between the fittest individual and the average for the population falls below a threshold, or the process is interrupted by the arrival of a new scan of data. The hypothesis of the fittest individual is reported as the hypothesis for that scan (although later hypotheses may amend it based on additional data). If the next scan contains more reports, then a new population is formed from random permutations of all the points in the window. This new population is operated on by the GA once more.

After 5 scans of data, the window is full and must slide forward to include the next scan. The individual with the highest score (the best hypothesis at scan 5) is used to calculate the fixed hypothesis for scan 1. The fixed hypothesis for scan 1 is constructed using the assignments in the best hypothesis for points with times before the end of scan 1.

This individual has the highest score for scan 5 but may or may not have the hypothesis with the highest score at scan 1. The fixed hypothesis for scan 1 may be different than the original hypothesis reported by the tracker and may in fact have a worse score at scan 1. The fact that selecting a hypothesis with a relatively poor score at an early scan may lead to a hypothesis with an optimum (or at least better than would be possible otherwise) score at a later scan is the reason for performing multi-scan optimization.

The new points from scan 6 are then added to the window containing the reports from scans 2–5 and the GA is invoked once more. While the associations for points before the start of the window may not be changed, points within the window may have associations with points outside.

The tracker continues in this manner indefinitely. The genomes of the individuals will be longer or shorter from one window to the next depending on how many points were generated over the scans in the window. At the start of each new scan, the tracker produces an output hypothesis which may or may not amend some of the associations in hypotheses output at previous scans.

Because of the computationally expensive nature of this process, the preferred embodiment spreads the GA across several parallel processors using the "island" model (familiar to those skilled in the art of GA programming. See, for example, D. Goldberg, Genetic Algorithms in Search, Optimization, and Machine Learning (Addison-Wesley, Reading, Mass., 1989). It should be noted that since each hypothesis is calculated independently of the others, the communications requirements between parallel processors can be very low.

Figure 5:
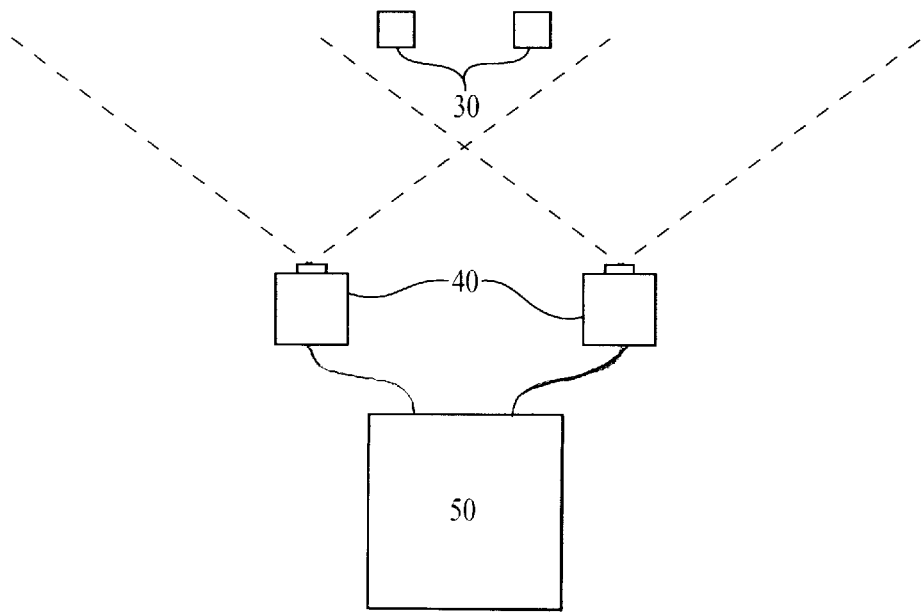
FIG. 5 schematically shows an apparatus according to the invention.

FIG. 5 is a schematic diagram of the apparatus of the invention. In FIG. 5, the objects 30 are tracked by sensors 40. Reports from the sensors 40 are sent to the computer 50, where the reports are processed.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of tracking at least one object, comprising:
   receiving sensor reports from at least one sensor over a window comprised of multiple time scans;
   formulating individuals in a GA population as permutations of the sensor reports;
   using each permutation to construct a hypothesis containing at least one track by a process of:
      taking each sensor report in turn in the order determined by the permutation;
      calculating for each sensor report the cost of assigning the sensor report to each of the tracks already formed (if any) and a start of a new track;
      making the lowest cost assignment available of the sensor reports until all of the sensor reports have been assigned to tracks;
   scoring each of the hypotheses;
   searching through a portion of the possible hypotheses, using a GA, to find a good hypothesis; and
   determining the state of the tracked object.

2. The method of claim 1, wherein the good hypothesis is an optimal hypothesis across the window of multiple time scans.

3. The method of claim 1, wherein multiple objects are tracked and further comprising determining states of the multiple objects.

4. The method of claim 1, wherein the method is performed over a sliding window of multiple time scans.

5. The method of claim 1, further comprising:
   forming a second window of multiple time scans that overlaps the window;
   receiving additional sensor reports from at least one sensor over the second window;
   formulating individuals in a GA population as permutations of the reports falling within the second window;
   using each permutation to construct a hypothesis containing at least one track by a process of taking each sensor report in turn in the order determined by the permutation and making the best assignment available to one of an existing track and a start of a new track;
   scoring each of the hypotheses;
   searching through a portion of the possible hypotheses, using a GA, to find a good hypothesis; and
   determining a second state of the at least one object.

6. The method of claim 5, further comprising repeating the steps of the claim for multiple windows.

7. An apparatus for tracking at least one object, comprising:
   means for receiving sensor reports from at least one sensor over a window comprised of multiple time scans;
   means for formulating individuals in a GA population as permutations of the sensor reports;
   means for using each permutation to construct a hypothesis containing at least one track by a process of:
      taking each sensor report in turn in the order determined by the permutation;
      calculating for each sensor report the cost of assigning the sensor report to each of the tracks already formed (if any) and a start of a new track;
      making the lowest cost assignment available of the sensor reports until all of the sensor reports have been assigned to tracks;
   means for scoring each of the hypotheses;
   means for searching through a portion of the possible hypotheses, using a GA, to find a good hypothesis; and
   means for determining the state of the tracked object.

8. The apparatus of claim 7, further comprising:
   means for forming a second window of multiple time scans that overlaps the window;
   means for receiving additional sensor reports from at least one sensor over the second window; and
   means for formulating individuals in a GA population as permutations of the reports falling within the second window.

9. A method of tracking at least one object, comprising:
   (a) receiving sensor reports from at least one sensor over a window comprised of multiple time scans;
   (b) formulating individuals in a GA population as permutations of the sensor reports;
   (c) decoding each permutation to construct a hypothesis for each permutation containing at least one track by a process of using each permutation to construct a hypothesis containing at least one track by a process of:
      taking each sensor report in turn in the order determined by the permutation;
      calculating for each sensor report the cost of assigning the sensor report to each of the tracks already formed (if any) and a start of a new track;
      making the lowest cost assignment available of the sensor reports until all of the sensor reports have been assigned to tracks;
   (d) scoring each of the hypotheses based on best overall fitness;
   (e) using a GA to find a good hypothesis comprising:
      (i) selecting a subpopulation of individuals for offspring production based at least in part on fitness;
      (ii) producing a next generation of individuals from the subpopulation;
      (iii) mutating the next generation of individuals stochastically;
      (iv) scoring the offspring according to fitness;
   (f) repeating step (e) at least once to arrive at at least one successor generation of individuals;
   (g) selecting the highest scoring individual from the at least one successor generation and declaring the individual to be a tentative hypothesis;
   (h) receiving new sensor reports from the at least one sensor over a window comprised of at least one scan occurring later in time than the reports from step (a);
   (i) adding the new sensor reports to at least some of the sensor reports from step (a);
   (j) repeating steps (b) through (g) at least once.

* * * * *